United States Patent [19]
Plegat

[11] 3,803,966
[45] Apr. 16, 1974

[54] APPARATUS FOR AUTOMATICALLY CUTTING A CONTINUOUSLY ADVANCING TUBE INTO SELECTED LENGTHS

[75] Inventor: Alain Edouard Plegat, Asnieres, France

[73] Assignee: Societe-Anonyme Des Usines Chausson, Asnieres, France

[22] Filed: July 3, 1972

[21] Appl. No.: 268,612

[30] Foreign Application Priority Data
July 5, 1971   France .............................. 71.24459

[52] U.S. Cl. ....................... 83/294, 83/314, 83/319
[51] Int. Cl. ...................... B23d 21/00, B23d 25/04
[58] Field of Search ............. 83/314, 319, 320, 294

[56] References Cited
UNITED STATES PATENTS
1,498,550  6/1924  Johnston .............................. 83/319
2,234,999  3/1941  Yoder ............................... 83/314 X
2,689,610  9/1954  Myers ............................... 83/320 X
2,776,384  1/1957  Long ................................. 200/22 X
2,540,166  2/1951  Frank et al. ....................... 83/319 X
3,309,952  3/1967  Walsh ............................... 83/314 X Primary Examiner—J. M. Meister
Attorney, Agent, or Firm—Imirie and Smiley

[57] ABSTRACT

The machine comprises a measuring device, a guide assembly and a cutting device comprising a resiliently retractable carriage supporting a cutting mechanism comprising gripping means and a shearing mechanism actuated according to the time established by said measuring device and which controls a common driving component.

8 Claims, 7 Drawing Figures

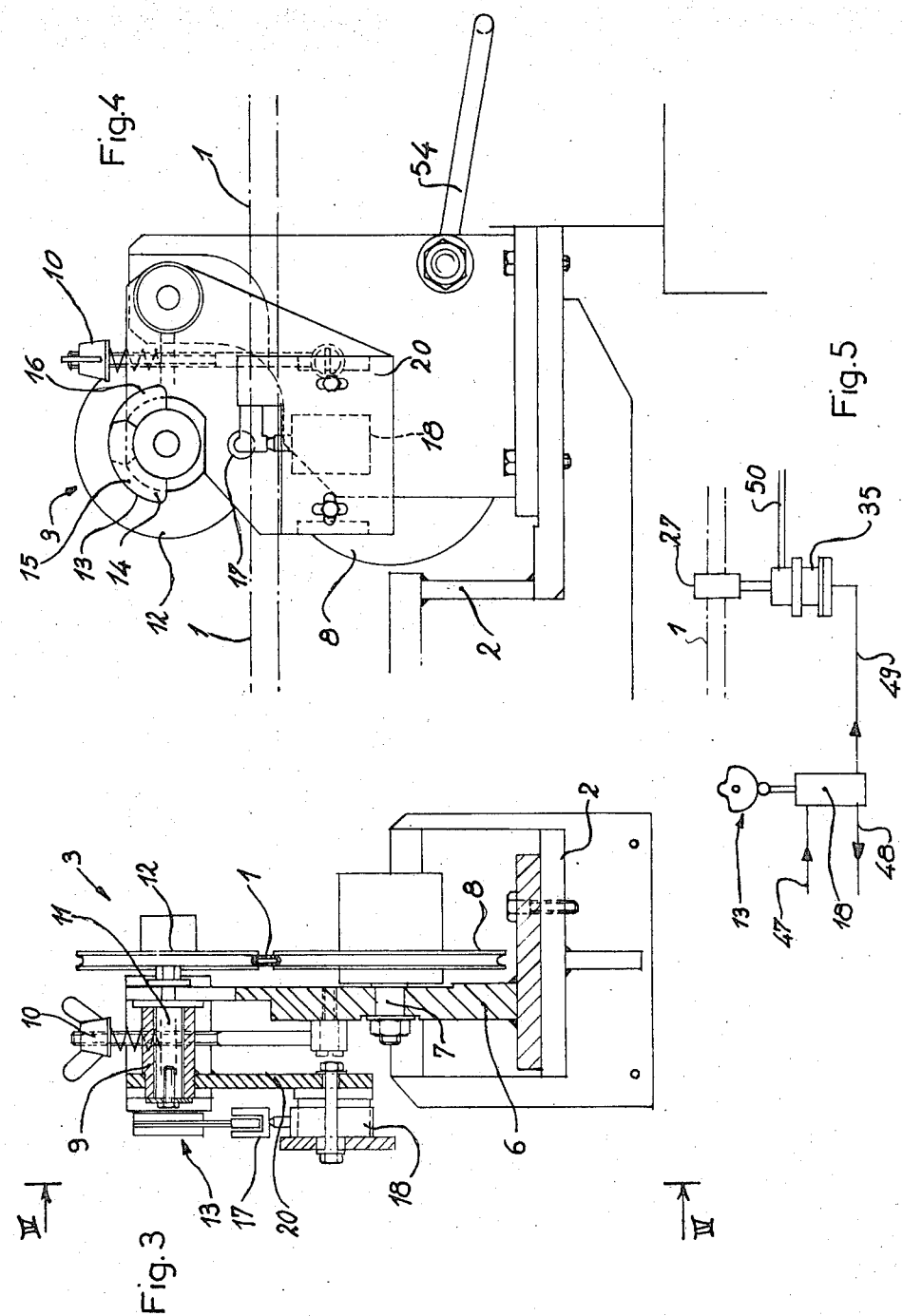

APPARATUS FOR AUTOMATICALLY CUTTING A CONTINUOUSLY ADVANCING TUBE INTO SELECTED LENGTHS

BACKGROUND OF THE INVENTION

In many technical fields and especially in the manufacturing of radiators for vehicles, tubular elements are utilized, which elements are obtained by cutting a continuously produced and movable tube into sections of determined length. The main problem is the difficulty in effecting high speed cutting of uniform lengths of sections of tubes and to make a clean cut. The difficulty is particularly obvious when the tubes are made of hard metal especially of stainless steel.

To solve the above mentioned problem it has been proposed to use saws with pendular motion connected through a transmission mechanism to a measuring device controlled by the movements of the tube. When the tubes are made of steel the saw has a very short period of utilization and the cuts which are performed are of a poor quality.

SUMMARY OF THE INVENTION

This invention relates to a new machine of simple construction and which provides accurate adjustments to cut tubes into sections of different lengths and regardless of the metal the tubes are made of.

According to the invention, the automatic machine for cutting into elements a continuously advancing tube comprises a measuring device of the speed of the tube, a guiding assembly for the tube, a cutting device on a resiliently retracted carriage supporting means for gripping holder the tube, said means being controlled by a driving mechanism also operating a cutting device on said carriage and of which the operation is controlled by an adjustable eccentric, rotated by the measuring device, whereby said carriage is directly driven by the tube during operation of said gripping means and the cut is made while the tube is gripped by said means.

BRIEF DESCRIPTION OF THE DRAWINGS

FIG. 3 is a transverse sectional view taken along line III—III of FIG. 1;

FIG. 4 is a partial side view seen from line IV—IV of FIG. 3;

FIG. 5 is a diagrammatic view showing the connection of some of the constituting elements of the machine;

DETAILED DESCRIPTION OF THE INVENTION

Figure 1:
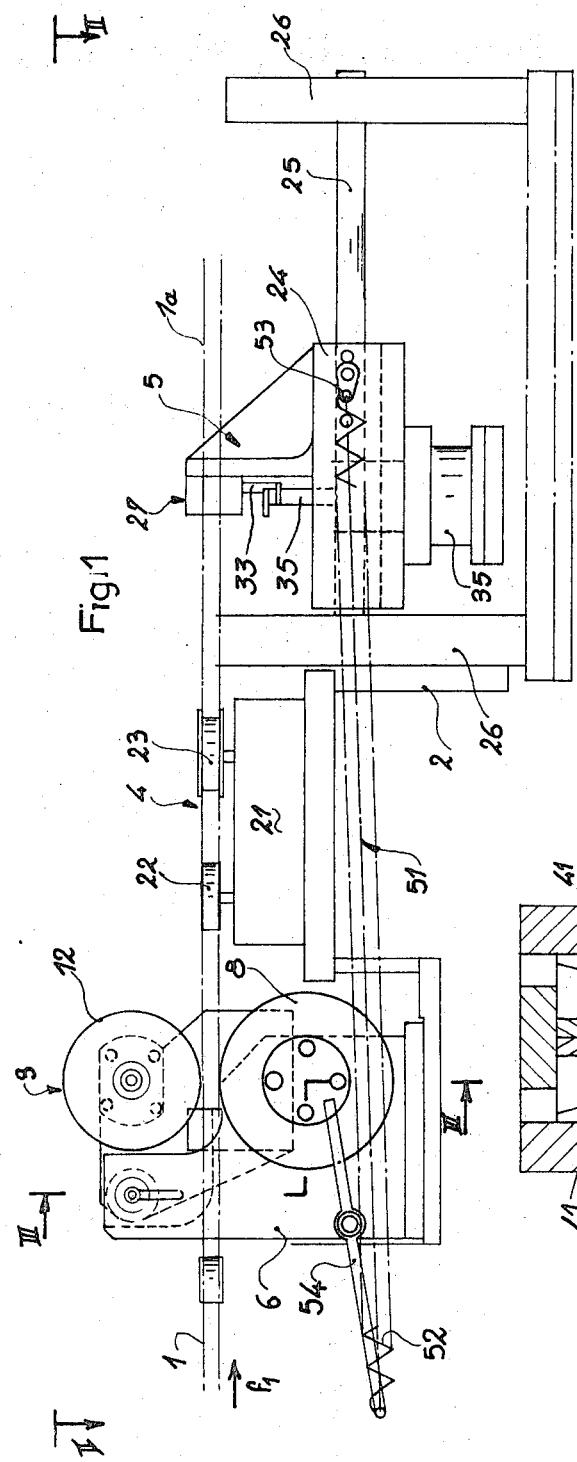
FIG. 1 is a diagrammatic elevation view of the machine according to the invention.
Figure 2:
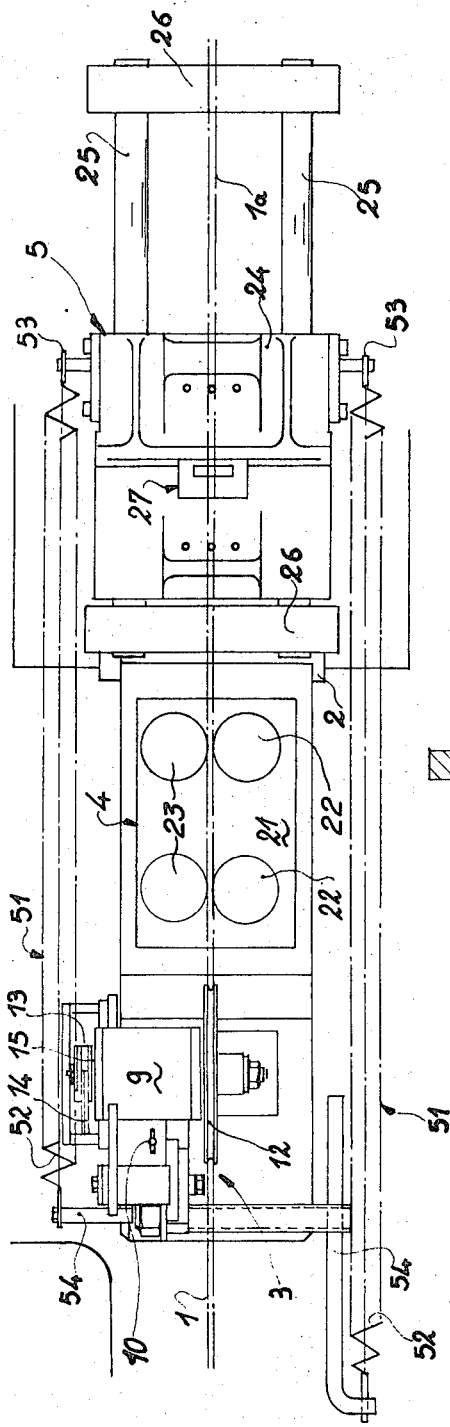
FIG. 2 is a plane view taken along line II—II of FIG. 1.

According to FIGS. 1 and 2, the machine of the invention is aligned with the output of a high speed tube forming machine machine; not to receive a continuously produced tube 1 for example having a flat cross-section. The machine of the invention comprises a frame 2 supporting a measuring device 3, a guide assembly 4 and a mobile cutting device 5.

The measuring device 3 comprises a bracket 6 (FIG. 3) journalling a spindle 7 supporting a bearing wheel 8. The bracket 6 also supports, on the upper portion thereof an horizontal bearing 9 of which the vertical position can be varied by an adjusting device 10. The bearing 9 journals a shaft 11 supporting, on one side of the bracket 6, a measuring wheel 12 which is complementary to the wheel 8 and is coplanor therewith. The adjusting device 10 consequently enables adjustment of the space between the wheels 12 and 8 as well as the pressure applied by them on the tube 1 in order to be driven by the tube without slippage therebetween.

The shaft 11 supports, on the end portion thereof which is opposite to the portion provided with the wheel 12, an eccentric 13 which is constituted, as shown in FIGS. 2 and 4, by two sectors 14 and 15 of the iris diaphragm type which can be more or less set off in relation with each other to vary the active arc length of a controlling cam 16 that they jointly define. The eccentric 13 is designed to operate the movable component 17 of a switch, for example a distributor 18, controlling the in or off operations of a pneumatic, electrical or hydraulic circuit, hereinafter described. The distributor 18 is fixed on a plate 20 suspended from the bearing 9 so as to always to occupy the same position in relation with the eccentric 13, regardless of the vertical adjustment of the measuring wheel 12 in comparison with the bearing wheel 8.

The guide assembly 4 comprises a plate 21 supporting two dual wheels 22 and 23 straddling the tube 1 in order to guide it both in the vertical plane and the horizontal plane. Though it is not shown, each of the dual wheels 22 and 23 can be adjustably supported to vary their spacing according to the cross-section area of the tube 1.

Figure 6:
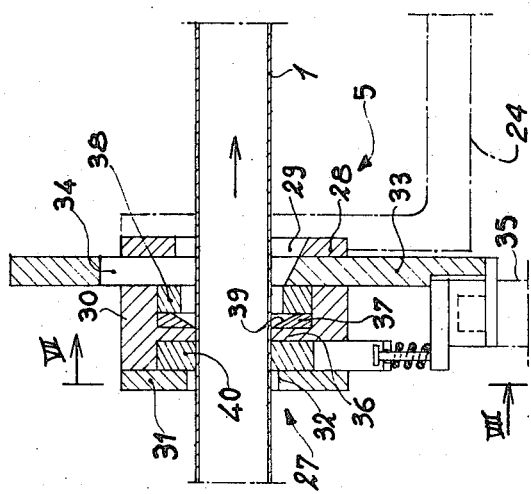
FIG. 6 is an enlarged partial sectional view showing more in detail one of the elements constituting the machine.

The cutting device 5 is constituted, for instance, as described in the French Pat. No. 70 42727 and comprises a carriage 24 slidable on guides 25 horizontally extending between two supporting webs 26 rising from frame 2. The carriage 24 supports, as shown in FIG. 6, a cutting mechanism 27 comprising a plate 28 having an aperture 29 traversed by the tube 1. The plate 28 is rigidly connected to a casing 30, the anterior side 31 thereof having an inlet opening 32 for the tube 1. The casing 30 constitutes a guide for a slide block 33 which is vertically movable and has an elongated slot 34. The slide block 33 is connected to the piston rod of a pneumatic jack 35, with double effect or with a differential feed, suspended from the carriage 24.

The casing 30 comprises an inner wall 36 against which is applied a shearing member 37 carried by a plate 38 which is movable in the direction perpendicular to the plane of FIG. 6. The plate 38 cooperates through fingers or studs with driving apertures in the sliding block 33, for example on each side of the elongated slot 34. The shearing member 37 has a median aperture 39, the edge of which is sharpened on the whole periphery thereof and delimits an outline of a cross sectional area wider than the cross sectional area of the tube 1.

Figure 7:
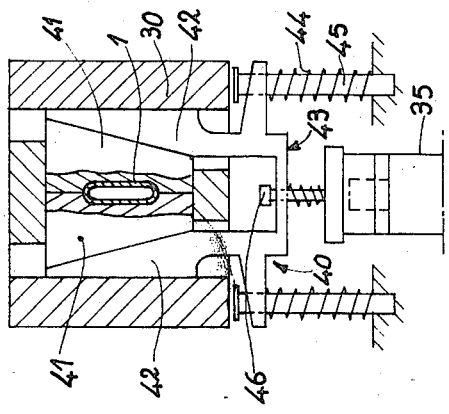
FIG. 7 is a transverse sectional view taken along line VII—VII of FIG. 6.

On its side opposite to the side in contact with the shearing member 37, the wall 36 supports a gripper 40 guided by the anterior side 31 of the casing 30. As shown in FIG. 7 the gripper 40 comprises two jaws 41 delimiting, between their adjacent edges, an opening corresponding in shape and size with to those of tube 1. The jaws 41 cooperate with two wedges 42 slidable within the casing 30 and constituting a time delay device including the two parallel arms of a yoke 43 that is urged upwardly in the casing by coil springs 44 surrounding laterally disposed to guides 45. The yoke 43 is connected by a return-pin 46 with the piston rod of the pneu-matic jack 35.

FIG. 5 diagrammatically shows the control system through the distributor 18 in the form of a pneumatic circuit comprising : a pipe 47 from a source of air under pressure and in communication with the distributor 18, a pipe 48 connecting the distributor 18 to a tank or eventually to the open air and a pipe 49 connecting the distributor 18 with the pneumatic jack 35, a which also is in communication with pipe 50 supplying permanently compressed air in the preferred case of a differential feed.

The carriage 24 is connected with to resilient return-means 51 illustrated in FIG. 1 and for example constituted by two helical springs 52 working on traction, the ends thereof being fixed on one hand on lugs 53 on the carriage 24 and, on the other hand, on pins 54 on the frame 2 or bracket 6.

The hereinbefore described apparatus operates as follows:

The covering range of the sectors 14 and 15 are adjusted for varying the arc length of the cam 16 to correspond with an operation time of the distributor 18 sufficient for the gripper 40 to grip the tube and the cutting device to cut said tube while said tube drives the carriage as explained in detail below.

The running of the tube 1 in the direction of arrow $f_1$ drives the wheel 12 which operates the eccentric 13 through shaft 11. From the reference position illustrated in FIGS. 3 and 4, the rotation of the eccentric 13 has, for a while, no influence on the movable component of the distributor 18, thus the pneumatic jack 35 occupies a position where, on the contrary to that shown in FIGS. 6 and 7, the jaws 41 are separated. The tube 1 can then freely pass through the cutting mechanism 27 of the carriage 24 which is maintained by springs 52 into the original position shown in FIG. 1.

When rotation of the eccentric 13 brings the cam 16 into contact with the movable component 17, the distributor 18 supplies pressure to the pneumatic jack 35 to drive its piston rod. The piston rod moves the yoke 43 towards the casing 30 through action of the springs 44. The wedges 42 push the jaws 41 toward each other to grip the tube 1 while ensuring the driving and the synchronized motion of the carriage 24 along guides 25.

The extension of the piston rod of jack 35 also lifts the slide block 33, and operates through control fingers (not shown) to reciprocates the shearing member 37 which causes the cutting of the portion of tube 1a extending beyond the mechanism 27. The cutting of the tubular section 1a is performed in the best conditions and provides a clean cut, since the carriage 24 supporting the shearing machine 37 has a motion speed exactly equal to the motion speed of the tube 1.

When the cam 16 of eccentric 13 is disengaged from the movable component 17, the distributor 18 stops the feeding of the pneumatic jack 35 through the pipe 49 and said jack is returned to its initial position by means of the compressed air permanently brought by the pipe 50. The pin 46 returns the yoke 43 to its original position and the withdrawal of the wedges 42 permits opening of the jaws 41 which release the tube 1. The carriage 24 is then returned to its original position by action of springs 52.

Then the machine can proceed to a second operating cycle similar to the above described cycle.

It is to be noted that upon reversing the feeding of the pneumatic jack 35, the sliding block 33 is retracted before the driving of yoke 43. The no-load motion shearing member 37 can be freely performed since the tube 1 is always held between jaws 41, the same being controlled for opening thereof only after the return to the original position of the slide block 33.

The invention is not restricted to the embodiment shown and described in detail, for various modifications thereof can moreover be applied to it without departing from the scope of the invention.

I claim :

1. An automatic machine for cutting into elements a continuously advancing tube comprising:
    a measuring device driven by the tube and controlled thereby,
    an adjustable eccentric directly connected to said measuring device and having an active length directly related to length of said elements to be cut,
    a resiliently retracted slidable carriage,
    said carriage carrying:
        a guide assembly comprising gripping means for the tube and a cutting device through which the advancing tube is passed,
    a driving mechanism having an input operatively connected to the adjustable eccentric whereby said driving mechanism is controlled by the advancing travel of the tube and in relation with the length of the elements to be cut,
    said driving mechanism having an output connected to said gripping means and to the input of a time delay device, said time delay device having its output connected to said cutting device,
    whereby at a period controlled by the advancing travel of the tube said gripping means are operated to hold the tube which causes advance of the cutting device with the slidable carriage, and whereby at a time during which the tube is still gripped said cutting device is actuated by said driving mechanism through said time delay device.

2. Machine as set forth in claim 1, wherein the measuring device comprises a bearing wheel and a measuring wheel, interchangeable, driven by a vertically adjustable shaft, said shaft driving the adjustable eccentric operating a switch of the driving device associated with the slidable carriage.

3. Machine as set forth in claim 2, wherein the shaft connecting the measuring wheel and the eccentric is journalled in a movable bearing also supporting a pneumatic distributor controlled by said adjustable eccentric.

4. Machine as set forth in claim 1, wherein the eccentric is constituted by two parallel and coaxial sectors which are individually adjustable to vary the driving time of the carriage by the tube.

5. Machine as set forth in claim 1, wherein the measuring and controlling device for the operation of the driving component supported by said carriage is fixed on a frame forming fastening points for at least one resilient component also fixed to the carriage and tending to bring said carriage back to its original position.

6. Machine as set forth in claim 5, wherein the resilient component is constituted by at least one helical spring working on traction.

7. Machine as set forth in claim 1, wherein the carriage supports a pneumatic jack, the piston rod thereof being connected on one hand to a vertically movable slide block associated to a shearing member and on the other hand to a gripping mechanism comprising a control yoke having two arms in the form of a wedge and operating two jaws surrounding the tube traversing the cutting mechanism.

8. Maching as set forth in claim 7, wherein the slide block is constituted for the operating stroke thereof to present a neutral range corresponding to the operation of the mechanism gripping the tube prior to cutting the same.

* * * * *